United States Patent [19]
Sasmazel et al.

[11] Patent Number: 5,923,879
[45] Date of Patent: Jul. 13, 1999

[54] CONVERSION SYSTEM AND METHOD BETWEEN CORBA AND C/C++ ARCHITECTURES FOR CORBA DATA PAIRS/COUPLES

[75] Inventors: Levent M. Sasmazel, Holmdel; David H. Schneider, Manalapan, both of N.J.

[73] Assignee: NCR Corporation, Dayton, Ohio

[21] Appl. No.: 08/887,143

[22] Filed: Jul. 2, 1997

[51] Int. Cl.⁶ ........................................... G06F 9/45
[52] U.S. Cl. ................... 395/705; 395/683; 707/102
[58] Field of Search .................... 395/705, 650, 395/800, 683, 500, 785, 611; 707/102

[56] References Cited

U.S. PATENT DOCUMENTS

| | | | |
|---|---|---|---|
| 5,375,237 | 12/1994 | Tanaka et al. | 395/650 |
| 5,493,671 | 2/1996 | Pitt et al. | 395/500 |
| 5,524,253 | 6/1996 | Pham et al. | 395/800 |
| 5,708,828 | 1/1998 | Coleman | 395/785 |
| 5,732,270 | 3/1998 | Foody et al. | 395/683 |
| 5,778,223 | 7/1998 | Velissaropoulos et al. | 395/611 |

OTHER PUBLICATIONS

CORBAplus for C++ User Manual, Expertsoft Corp., pp. 2–2, 3–1, and 3–20 May 27, 1996.

*Primary Examiner*—Tariq R. Hafiz
*Assistant Examiner*—Antony Nguyen-Ba

[57] ABSTRACT

A conversion system converts data between CORBA and C/C++ environments. The conversion system includes a format definition database storing first information including, for example, user definitions, C/C++ specific information and/or CORBA specific information. A system dependent database stores second information including, for example, operating system and processor specific information. A parser parses the first and second information into a data dictionary. A decoder generates C/C++ memory structures using the data dictionary and CORBA data couples. An encoder generates CORBA data couples using the data dictionary and C/C++ memory structures.

17 Claims, 7 Drawing Sheets

CONVERSION SYSTEM AND METHOD BETWEEN CORBA AND C/C++ ARCHITECTURES FOR CORBA DATA PAIRS/COUPLES

BACKGROUND OF THE INVENTION

1. Field of the Invention

The present invention is related to conversion systems and methods between CORBA and C/C++ architectures, and more particularly, to conversion systems and methods between CORBA and C/C++ architectures for CORBA data structure types called data pairs or couples.

2. Background of the Related Art

A widely used distributed system standard is the Object Management Group's (OMG) Common Object Request Broker Architecture (CORBA). With respect to heterogeneity, for example, programmers can hide details of the underlying hardware and system software behind a portable interface, using CORBA's Interface Definition Language (IDL).

IDL is a declarative language that is independent of the target programming language and operation system. It allows CORBA objects to invoke operations on each other even when implemented in different languages and even when running on incompatible operating systems.

Wrapper objects and Object Request Broker (ORB) gateways enable interoperability by letting programmers interface new technology to legacy information systems. CORBA supports the development of highly modular applications, so programmers can more easily achieve extensibility—as well as better maintainability.

However, neither CORBA nor the complementary OMG Common Object Services Specification adequately addresses availability and reliability. CORBA does not support the dynamic replication of object implementations and cannot consistently detect partial failures in a distributed application. See, for example, Silvano Maffeis, Piranha: A COBRA Tool for High Availability, IEEE COMPUTER 59 (April 1997), incorporated herein by reference.

CORBA is emerging as an architectural standard within the call center environments. Integration between CORBA and standard C/C++ environments is an issue that all integrators in the call center business face. In CORBA, a type is an identifiable entity with an associated predicate (a single-argument mathematical function with a boolean result) defined over values. A value satisfies a type if the predicate is true for that value. A value that satisfies a type is generally called a member of the type.

Figure 1:
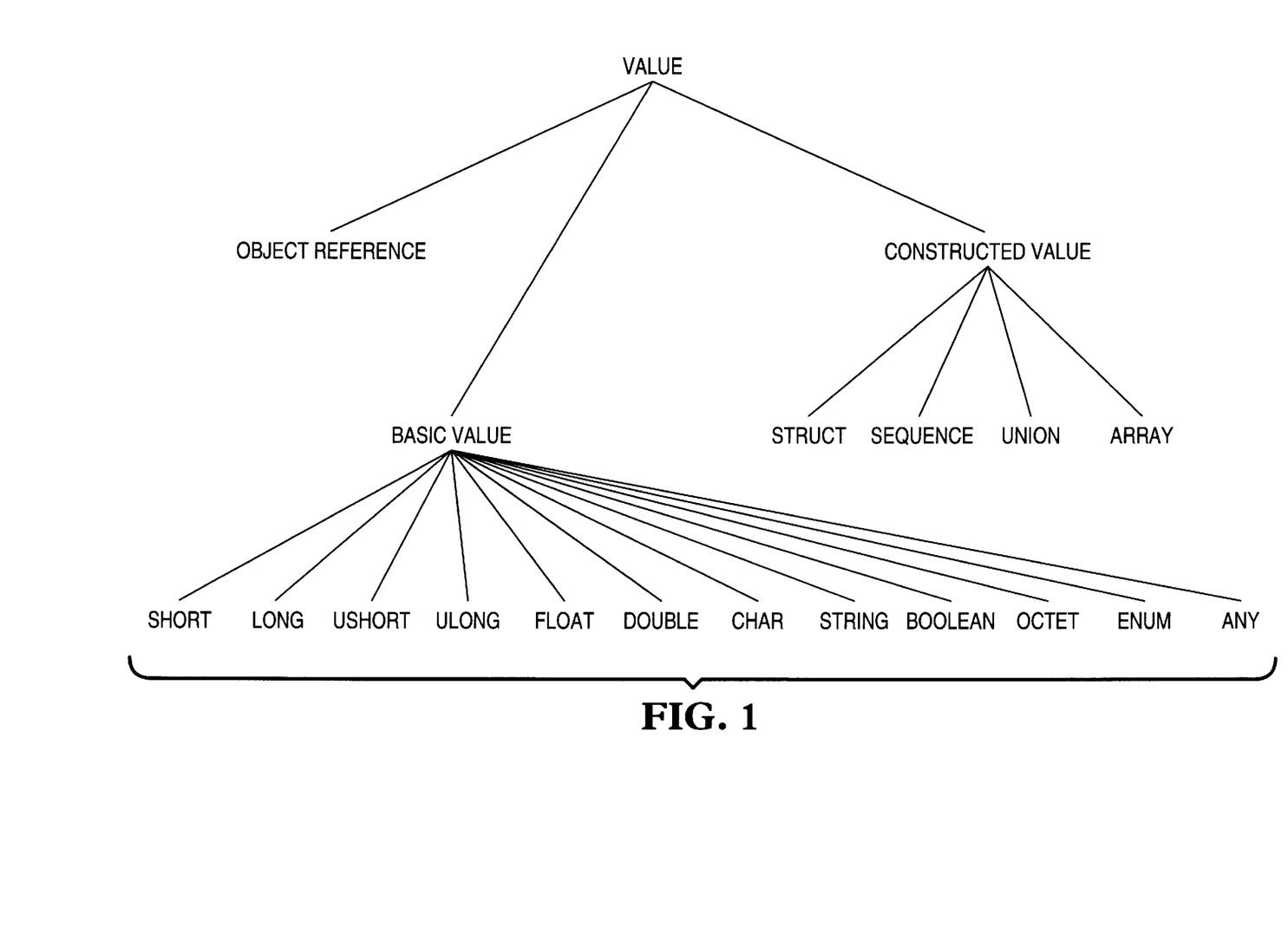
FIG. 1 is a tree diagram of the legal values of types in the CORBA architecture.

The following is a description on constraints on the data types:

Basic type
  16-bit and 32-bit signed and unsigned 2's complement integers
  32-bit and 64-bit IEEE floating point numbers
  Characters, as defined in ISO Latin-1 (8859.1)
  A boolean type taking the values TRUE and FALSE
  An 8-bit opaque datatype, guaranteed to not undergo any conversion during transfer between systems
  Enumerated types consisting of ordered sequences of identifiers
  A string type which consists of a variable-length array of characters; the length of the string is available at runtime.
  A type "any" which can represent any possible basic or constructed type Constructed types
  A record type (called struct), consisting of an ordered set of (name, value) pairs
  A discriminated union type, consisting of a discriminator followed by an instance of a type appropriate to the discriminator value
  A sequence type which consists of a variable-length array of a single type; the length of the sequence is available at runtime
  An array type which consists of a fixed-length array of a single type
  An interface type, which specifies the set of operations which an instance of that type must support Values in a request are restricted to values that satisfy these type constraints. The legal values of types are shown in FIG. 1.

The CORBA architecture presents a relatively new data structure type called the record type, or more commonly known as data pairs or couples. In this architecture, a data pair contains two linked objects; a name and a value. Information in these pairs is stored as variable length strings. Grouped data objects can also be represented by this name/value coupling of the CORBA as a sequence of value pairs.

This grouping of names and values into a sequence of couples is similar to the structures used in C/C++ to group data. These structures can contain not only variable length strings (as CORBA is limited to), but, we have realized, can also include any basic data type defined by ANSI for the C/C++ languages.

The application programmer, who works with these two environments (i.e., CORBA and C/C++) faces the problem of converting information between these two data storage methods. Accordingly, we have identified the need for transparent conversion routines between the two environments of the CORBA to conventional C/C++ data structure converter (hereafter referred to as "the converter").

Since CORBA is a relatively new technology for the industry, there is no known solution to this conversion problem. Usually the solution is up to the capacity of the programmer and the specifics of the problem being dealt with on the particular project. For example, the following is a discussion of standard schemes used to convert between CORBA and the C/C++ environments.

Examples of the basic data types having the mappings between CORBA and C are shown in Table 1 below. Implementations are responsible for providing typedefs for CORBA_short, CORBA_long, and so forth, consistent with standard CORBA requirements for the corresponding data types.

TABLE 1

| CORBA | C |
|---|---|
| short | CORBA_short |
| long | CORBA_long |
| unsigned short | CORBA_unsigned_short |
| unsigned long | CORBA_unsigned_long |
| float | CORBA_float |
| double | CORBA_double |
| char | CORBA_char |
| boolean | CORBA_boolean |
| octet | CORBA_octet |

The C mapping of the boolean types is, for example, unsigned char with only the values 1 (TRUE) and 0 (FALSE) defined. CORBA_boolean is provided for symmetry with the other basic data type mappings.

Examples of the basic data types having the mappings between CORBA and C++ are shown in Table 2 below. The mapping of the boolean type defines, for example, only the values 1 (TRUE) and 0 (FALSE).

TABLE 2

| CORBA | C++ |
|---|---|
| short | CORBA::Short |
| long | CORBA::Long |
| unsigned short | CORBA::UShort |
| unsigned long | CORBA::ULong |
| float | CORBA::Float |
| double | CORBA::Double |
| char | CORBA::Char |
| boolean | CORBA::Boolean |
| octet | CORBA::Octet |

Each basic type is mapped to a typedef in the CORBA module. This is because some types, such as short and long, may have different representations on different platforms, and the CORBA definitions will reflect the appropriate representation. For example, on a 64-bit machine where a long integer is 64 bits, the definition of CORBA::Long would still refer to a 32-bit integer.

Except for boolean, char, and octet, the mappings for basic types must be distinguishable from each other for the purposes of overloading. That is, one can safely write overloaded C++ functions on Short, UShort, Long, ULong, Float, and Double.

Thus, the existing conversion techniques focus on, or involve, predetermined mappings that may not be suitable for specific hardware and/or operating system environments. Further, with respect to converting couples or data pairs, this conversion process in a software client environment is almost impossible for two reasons:

1. The distributed processing environment.
2. Most organizations having a variety of brands of server and client machines with different processors (CPU's) and operating systems. We have determined, however, that it is desirable to develop a value pair encoder, decoder system (or converter). We have realized that the converter system should meet the following design criteria:
1. Transparent to the client programmer,
2. Flexible enough to support different memory structures,
3. Portable so different hardware platforms and operating systems can be supported, and
4. Fast.

We have also realized that this conversion process should performed in a general purpose way, meaning the mapping of information can be changed by modifications to an initialization file. In this connection, we have realized that it is desirable that the mapping of information does not require changing the converter software each time to add, change or remove translations.

We have further determined that it is desirable that the conversions are performed in a manner to hide structure alignment issues from the client.

We have also realized that this conversion process needs to be evaluated individually and converted according to the alignment and size of the hardware, and also needs to be transmitted to the server in a C/C++ style message structure.

We have also realized that it is desirable to eliminate the need for client programs and programmers to know the hardware and software characteristics of a corresponding server.

SUMMARY OF THE INVENTION

The CORBA architecture presents a relatively new data structure type called data pairs or couples. In this architecture, a data pair always contains two linked objects; a name and a value. Information in these pairs is stored as variable length strings. Grouped data objects can also be represented by this name/value coupling of the CORBA as a sequence of value pairs.

This grouping of names and values into a sequence of couples is similar to the structures used in C/C++ to group data. These structures can contain not only variable length strings (as CORBA is limited to), but can also include any basic data type defined by ANSI for the C/C++ languages.

The application programmer, who works with these two environments is facing the problem of converting information between these two data storage methods. The need for transparent conversion routines between the two environments was our starting point for our development of the CORBA to conventional C/C++ data structure converter (hereafter referred to as "the converter").

Since CORBA is a relatively new technology for the industry, there is no known solution to this conversion problem. Usually the solution is up to the capacity of the programmer and the specifics of the problem being dealt with on the particular project.

The data gathered by the CORBA client programmer from the user has the value pair structure described in the previous section. To be processed as a transaction, this data needs to be evaluated individually and converted according to the alignment and size of the hardware, and transmitted to the server in a C/C++ style message structure.

The core of this gateway functionally is converting the CORBA sequence of couples used to make requests from a software client to a C/C++ style structure expected by, for example, NCR's TOP END program, or any other program that needs a C/C++ style data structure. The conversion from C/C++ structures to CORBA sequence of couples is also performed. This conversion is done in a general purpose way, meaning the mapping of information can be changed by modifications to an initialization file, and do not require changing the converter to add, change or remove translations. The data conversion algorithm is done on the computer system where the data is sent to the software server that uses the C/C++ style structures.

It is therefore a feature and advantage of the present invention to develop a value pair encoder, decoder system (or converter).

It is another feature and advantage of the present invention in a conversion process performed in a general purpose way, where the mapping of information can be changed by modifications to an initialization file.

It is another feature and advantage of the present invention in not requiring change of the converter software each time to add, change or remove translations.

It is another feature and advantage of the present invention in performing conversions to hide structure alignment issues from the client.

It is another feature and advantage of the present invention in a conversion process that does not require separate evaluation according to the alignment and size of the hardware in a C/C++ style message structure.

It is another feature and advantage of the present invention in a eliminating the need for client programs and programmers to know the hardware and software characteristics of a corresponding server.

In accordance with one embodiment of the invention, a conversion system converts data between CORBA and C/C++ environments. The conversion system includes a format definition database storing first information including, for example, user definitions, C/C++ specific information and/or CORBA specific information. A system dependent database stores second information including, for example, operating system and processor specific information. A parser parses the first and second information into a data dictionary. A decoder generates C/C++ memory structures using the data dictionary and CORBA data couples. An encoder generates CORBA data couples using the data dictionary and C/C++ memory structures.

In accordance with another embodiment of the invention, a conversion method converts data between CORBA and C/C++ environments. The conversion method includes the steps of storing first information including at least one of user definitions and at least one of C/C++ and CORBA specific information, and storing second information including at least one of operating system and processor specific information. The conversion method also includes the step of parsing the first and second information into a data dictionary. C/C++ memory structures are generated using the data dictionary and CORBA data couples, and/or CORBA data couples are generated using the data dictionary and C/C++ memory structures.

These together with other objects and advantages which will be subsequently apparent, reside in the details of construction and operation as more fully herein described and claimed, with reference being had to the accompanying drawings forming a part hereof wherein like numerals refer to like elements throughout.

DESCRIPTION OF THE PREFERRED EMBODIMENT OF THE INVENTION

The structure of the CORBA architecture includes a reference model, which consists of the following components:

Object Request Broker, which enables objects to transparently make and receive requests and responses in a distributed environment. It is the foundation for building applications from distributed objects and for interoperability between applications in hetero- and homogeneous environments.

Object Services, a collection of services (interfaces and objects) that support basic functions for using and implementing objects. Services are necessary to construct any distributed application and are always independent of application domains. Specifications for Object Services are contained in *CORBAservices: Common Object Services Specification*, incorporated herein by reference.

Common Facilities, a collection of services that many applications may share, but which are not as fundamental as the object services.

Application Objects, which are products of a single vendor on in-house development group which controls their interfaces. Application objects correspond to the traditional notion of applications, so they are not standardized by OMG. Instead, application objects constitute the uppermost layer of the Reference Model.

The object request broker is the core of the Reference Model. It is like a telephone exchange, providing the basic mechanism for making and receiving calls. Combined with the object services, it ensures meaningful communication between CORBA-compliant applications.

The CORBA architecture also includes an object model that provides an organized presentation of object concepts and terminology. It defines a partial model for computation that embodies the key characteristics of objects as realized by the submitted technologies. The OMG object model is abstract in that it is not directly realized by any particular technology. The model described here is a concrete object model. A concrete object model may differ from the abstract object model in several ways:

It may elaborate the abstract object model by making it more specific, for example, by defining the form of request parameters or the language used to specify types.

It may populate the model by introducing specific instances of entities defined by the model, for example, specific objects, specific operations, or specific types.

It may restrict the model by eliminating entities or placing additional restrictions on their use.

An object system is a collection of objects that isolates the requesters of services (clients) from the providers of services by a well-defined encapsulating interface. In particular, clients are isolated from the implementations of services as data representations and executable code.

The object model first describes concepts that are meaningful to clients, including such concepts as object creation and identity, requests and operations, types and signatures. It then describes concepts related to object implementations, including such concepts as methods, execution engines, and activation. The object model is most specific and prescriptive in defining concepts meaningful to clients.

There are some other characteristics of object systems that are outside the scope of the object model. Some of these concepts are aspects of application architecture, some are associated with specific domains to which object technology is applied. Such concepts are more properly dealt with in an architectural reference model. Examples of excluded concepts are compound objects, links, copying of objects, change management, and transactions. Also outside the scope of the object model is the model of control and execution.

The object model is an example of a classical object model, where a client sends a message to an object. Conceptually, the object interprets the message to decide what service to perform. In the classical model, a message identifies an object and zero or more actual parameters. As in most classical object models, a distinguished first parameter is required, which identifies the operation to be performed; the interpretation of the message by the object involves selecting a method based on the specified operation. Operationally, method selection could be performed either by the object or the ORB.

An object system provides services to clients. A client of a service is any entity capable of requesting the service. An object system includes entities known as objects. An object is an identifiable, encapsulated entity that provides one ore more services that can be requested by a client.

Clients request services by issuing requests. A request is an event, i.e. something that occurs at a particular time. The information associated with a request consists of an operation, a target object, zero or more (actual) parameters, and an optional request context. A request form is a description or pattern that can be evaluated or performed multiple times to cause the issuing of requests.

A value is anything that may be a legitimate (actual) parameter in a request. A value may identify an object, for the purpose of performing the request. A value that identifies an object is called an object name. More particularly, a value is an instance of an OMG IDL datatype. An object reference is an object name that reliably denotes a particular object. Specifically, an object reference will identify the same object each time the reference is used in a request. An object may be denoted by multiple, distinct object references.

A request may have parameters that are used to pass data to the target object; it may also have a request context which provides additional information about the request. A request causes a service to be performed on behalf of the client. One outcome of performing a service is returning to the client the results, if any, defined for the request.

Objects can be created and destroyed. From a client's point of view, there is no special mechanism for creating or destroying an object. Objects are created and destroyed as an outcome of issuing requests. The outcome of object creation is revealed to the client in the form of an object reference that denotes the new object.

Figure 2:
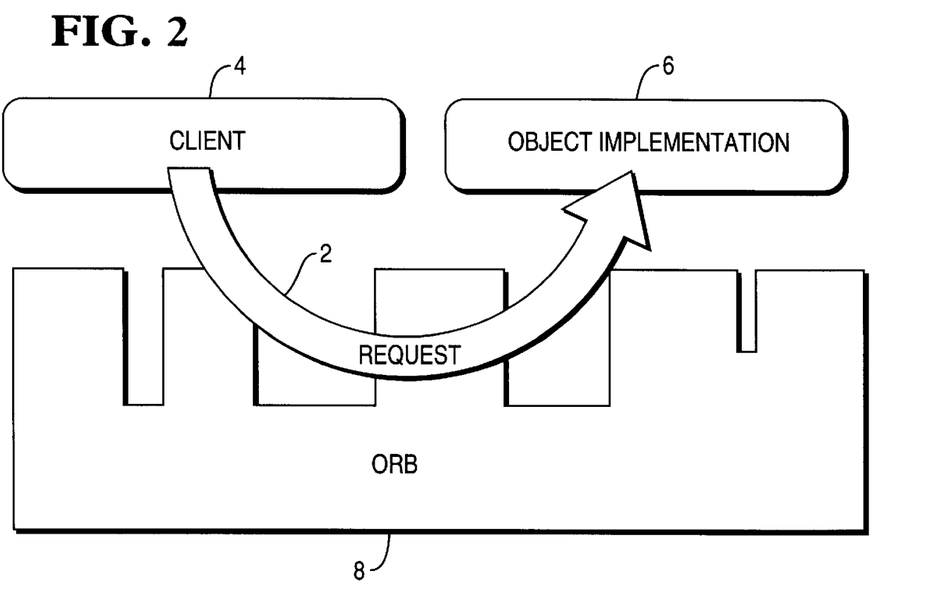
FIG. 2 is an illustration of a request being sent by a client to an object implementation.

FIG. 2 shows a request 2 being sent by a client 4 to an object implementation 6. The client 2 is the entity that wishes to perform an operation on the object and the object implementation 6 is the code and data that actually implements the object. The ORB 8 is responsible for all of the mechanisms required to find the object implementation for the request 2, to prepare the object implementation 6 to receive the request, and to communicate the data making up the request. The interface the client sees is completely independent of where the object is located, what programming language it is implemented in, or any other aspect which is not reflected in the object's interface.

A client of an object has an object reference that refers to that object. An object reference is a token that may be invoked or passed as a parameter to an invocation on a different object. Invocation of an object involves specifying the object to be invoked, the operation to be performed, and parameters to be given to the operation or returned from it.

Figure 3:
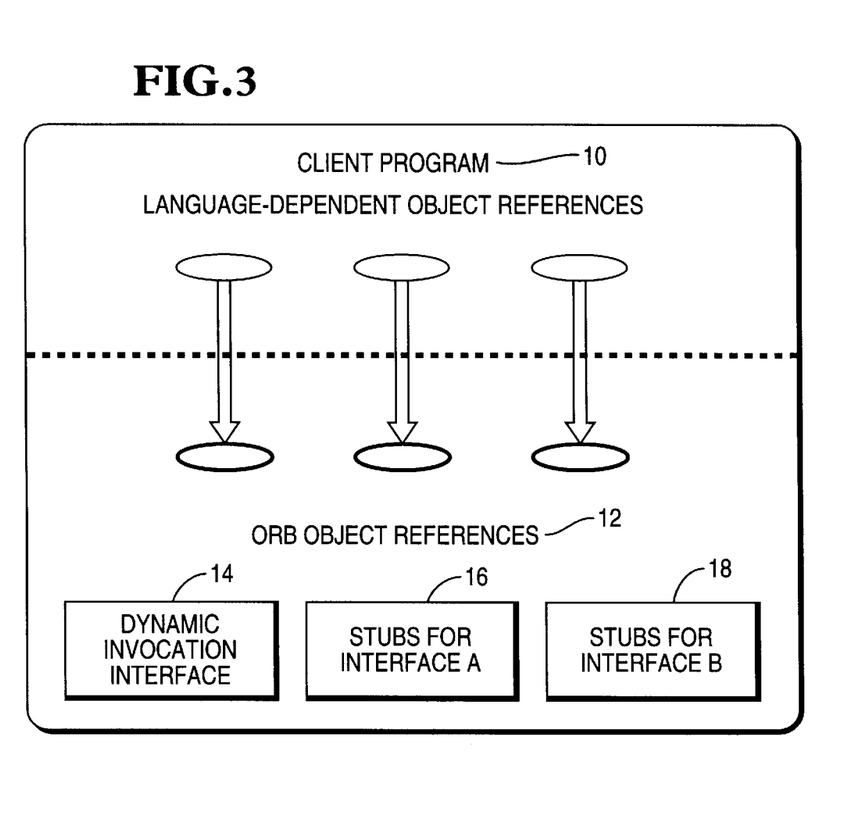
FIG. 3 is an illustration of the structure of a typical client.

The ORB manages the control transfer and data transfer to the object implementation and back to the client. In the event that the ORB cannot complete the invocation, an exception response is provided. Ordinarily, a client calls a routine in its program that performs the invocation and returns when the operation is complete. As illustrated in FIG. 3, client programs 10 access object-type specific stubs 12 (e.g., dynamic invocation interface 14, stubs for interface A, and/or stubs for interface B) as library routines in their program. The client program sees routines callable in the normal way in its programming language.

Figure 4:
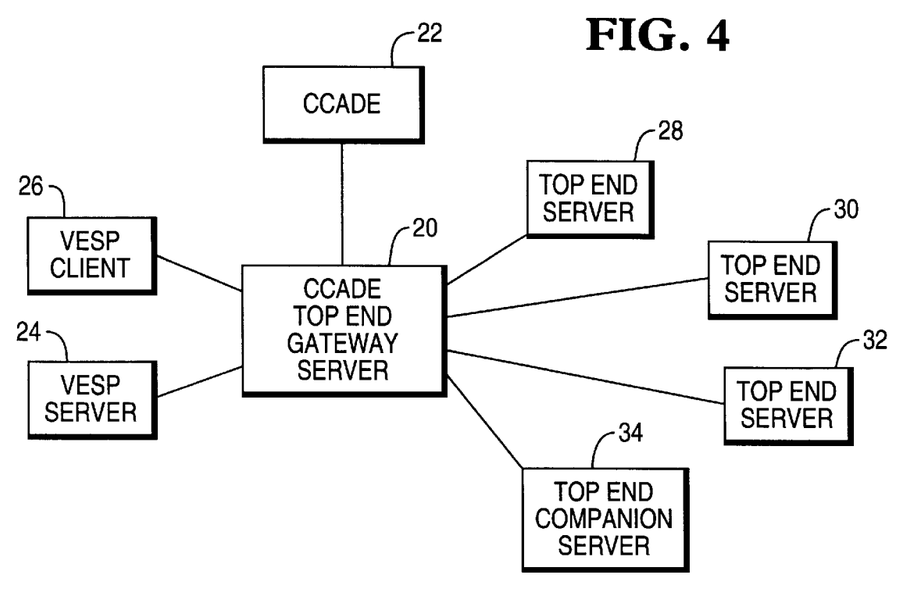
FIG. 4 is an illustration of the component architecture for the Top End Gateway (TEGW) server.

The component architecture for the TEGW is shown in FIG. 4. As illustrated in FIG. 4, the CCADE TOP END Gateway server 20 passes requests from CCADE 22 or Voice Enhanced Services Platform (VESP, from Nabnasset Corp., Acton, Mass. ) servers 24 and clients 26 to different TOP END products and functions 28, 30, 32 and/or 34.

The converter system and process described below is a central part of the TOP END Gateway server (TEGW) 20 for the standard Voice Enhanced Services Platform (VESP) product in the standard NCR Call Center Applications Development Environment (CCADE) product. This TEGW product is part of the Computer Telephony Integration (CTI) Solutions for Call Centers program. TEGW 20 also receives the TOP END responses and passes them back to a calling application. The gateway will not make VESP or CCADE services available to TOP END servers or clients.

The CCADE TOP END Gateway 20 supports login and logoff of clients and servers to TOP END. It also supports the sending and receiving of messages. For example, during call qualification, a TOP END function could be called to retrieve the callers profile from a legacy system. As another example, information on the availability of rental cars could be retrieved from the desktop by invoking a TOP END function on an enterprise server.

TOP END is a middleware solution that manages, loads, balances, and provides reliable transaction transport for large and complex distributed host and database networks. The integration with TOP END through the TOP END Gateway 20 allows Call Center Application Development Environment (CCADE) 22 clients and servers to be insulated from the physical topography of the solution. Acting as a "gateway" this integration point will act to hide:

Specific data conventions, differences between databases, and database-dependent details from the client and other servers The topology (location, centralized versus distributed database) and management of the data network from the client/other servers.

The network protocol (e.g. LU6.2) from the clients requesting service. The gateway may also act as a protocol converter to support on-line sessions between a client and the host.

The Voice Enhanced Services Platform (VESP) 24, 26 is, for example, a CORBA based CTI middleware from Nabnasset Corp. (Acton, Mass.), OEM'd by NCR. The TOP END Gateway server 20 acts to accept CORBA calls from software clients, and translates them to TOP END calls. The TEGW 20 acts as a layer between the VESP client software 24, 26 and TOP END servers, 28, 30, 32, 34. All TOP END service calls initiated by the client are converted into message structures which the TOP END server can process.

CCADE/VESP clients or servers make call to one of four TEGW methods:

TEGW.Login—Establishes a TOP END dialogue for the client. This dialogue stays open until the client terminates or calls TEGW.Logout. The client must include a login id and password for the TOP END system. A dialogue id is returned from this method to the client, and is used in all subsequent communications with the TEGW.

TEGW.Send—This method is used to send a request to a TOP END service. One of the parameters the client includes in the method call is a message id that must be used when invoking the receive function to get the send's results.

TEGW.Receive—This method is used to receive a request from a previously invoked TEGW.Send. It can be invoked in blocking (where the call doesn't return until the response from the TOP END service is received), or non-blocking (where the call returns immediately, whether the TOP END service response has been received or not). Both the dialogue id from the TEGW.Login and message id from the TEGW.Send must be included int he method call. The TEGW.Receive call returns a maximum of one TOP END response, and should be called multiple times if more than one responses is expected from TOP END.

TEGW.Logout—Tears down the dialogue created with TEGW.Login. This method will return an error if there are outstanding responses waiting for a TEGW.Receive, but an option may be sent that forces the logout.

The TEGW 20 translates the sequence of couples sent to the methods from the VESP client 26, servers 24, and/or other components in CCADE 22 to the input structure for the applicable TOP END product and function. When receiving responses, the TOP END Gateway 20 output structures are converted to a sequence of couples for the calling VESP object. These conversions are performed based on information in the tegw.ini file, described below in detail.

When the Server Starts

The TEGW starts, as all VESP servers do, by running the Server_user_init routine. In this routine, the server:
1. Registers the Login, Logout, Send and Receive methods with the VESP ORBServer.
2. Sets the server version reported during VESP Ping request.
3. Loads the server trace level from the server definition in the VESP Directory Server.
4. Loads the VESP/TOP END function conversion information from the tegw.ini file by invoking the Read Entities routine. These mappings convert between the VESP sequence of couples and the C/C++ style data structures TOP END expects as the format of input and output routines.
5. Calls tp_initialize to register the server as a TOP END client with the TOP END Node Manager running on the CTI Server.
6. Calls tx_open to open a TOP END session with the Node Manager.
7. Initializes the message queue with the Init GWS Manager function call. This queue holds all messages received from TOP END before a client calls the TEGW.Receive to get them, and also stores all outstanding requests from VESP clients for which no TOP END messages have yet been received.
8. Initializes the TEGW linked list of client dif structures by calling a manager function. The pointer returned is the location of the root structure which is global to the entire gateway. Note that this structure contains both a dif structure, and the client object. The dif structure is normally the only portion of this structure used, but the object identifier is also saved so proper cleanup can be done in case the client dies and the Server_client_terminate method is invoked.

The Client Logs In

The TEGW.Login method is called when a client wishes to establish a dialogue with TOP END. The client must establish this dialogue before sending any requests or receiving any responses. The method:
1. Allocates a dif structure for the client using the TOP END call tp_csi_alloc.,
2. Adds the dif structure to the queue of active dialogues inside the gateway by calling the function AddDIF,
3. Parses through the sequence of couples to set any of the optional login variables (loginid, loginpw and user_dialogue_id),
4. Logs the client on to TOP END will the tp_client_signon function, and
5. Returns the tp_sys_dialogue_id and tp_user_dialogue_id to the calling client.

For Each Send a Client Performs

This method is called by a VESP client, VESP server, and/or CCADE component (hereinafter "client") when a message is to be sent to a TOP END function. The client sends a sequence of a sequence of couples to the function. The first sequence of couples contains administrative information about where the request should go and how is should be routed, and the second sequence of couples contain input records for the send. The function:
1. Searches through the first sequence of couples to find required and optional parameters for the tp_client_send. The routine searches for the required TOP END product and function names, and the system and user dialogue id's generated from the TEGW.Login. The required couple structure contains the name of the input structure into which the second sequence of couples is to be converted. It also searches for the optional routing qualifier, user message id, function qualifier and flags couples.
2. Prepares the clients dif structure for the send. The method uses the system and user dialogue id's and the FindDIF-PTR function to find the dif structure for the client. After finding the correct dif structure, the method updates the structure with the values previously decoded from the input sequence of couples.
3. Converts the input records from a sequence of couples to the input structures for the send expected by the The TOP END function using the GWEncode routine, and
4. Sends the message using the TOP END tp_client_send. If the tp_client_send is not successful, the error code is returned to the invoking client.

The Server Watches for Messages from TOP END

Part of the benefits of being a VESP managed server are that the ORBServer invokes the Server_user_poll routine many times each second. This routine is used to watch for responses coming from TOP END back to the TEGW. This routine:
1. Invokes a tp_client_receive with the appropriate parameters set to receive any outstanding messages, regardless of system dialogue id, user dialogue id, or user message id.
2. If a message is received, the TEGW_Message In routine is invoked. This routine looks at the information coming from the tp_client_receive, and tries to match it with an outstanding request in the message queue put there by a client waiting for a response. If it finds a match, it calls GWDecode to translate the message from the TOP END output structure to the VESP sequence of couples, and returns the deferred response to the client.
3. If there are no outstanding requests for the information on the message queue, the response in put on the queue using the AddGWSession function call.

When the Client Invokes the Receive Method

The TEGW.Receive method registers requests from the clients to have a single response from a previous TEGW.Send to them. The method:
1. Parses through the input sequence of couples and decodes the configuration options, the client must send the system_dialogue_id and user_dialogue_id from the TEGW.Login. The structure couple must also be sent to indicate which part of the tegw.ini file should be used to convert the return structure from TOP END into a sequence of couples for return to the client.
2. Calls the GW_client_receive routine. This routine finds any messages in the message queue matching the invoking parameters with the Find SessionPTR function. If no matching messages are waiting, and blocking is set, AddGWSession is called to add a structure to the message queue letting the TEGW know there is an outstanding request for a message, and no message is returned to the client. If the noblock option is not set, AddGWSession is not called, and an empty message is returned to the calling client.

3. Finally in the GW_client_receive routine the GWDecode routine is called to translate the output structure from TOP END into a sequence of couples to be returned to the client.

When the Client Logs Out From the Server

When the client wishes to end a session with the TEGW server, it invokes the TEGW.Logout method. The method accepts the system_dialogue_id and user_dialogue_id from the TEGW.Login method, and includes a flag indicating if the client should be logged of unconditionally. The routines:

1. Examines the LogoutFlags included in the invocation, and uses the FindSessionPTR routine to determine if the method should immediately fail. If the FORCE flag is not set, and FindSessionPTR returns a valid message in queue, the routine fails.
2. If the LogoutFlags is not set to FORCE, FindSessionPTR is called to locate any queued messages or requests for receives with matching system_dialogue_id and user_dialogue_id. For each of these found, DelGWSession is called to remove them from the queue and free any associated memory.
3. After removing all leftover messages, FindDIFPTR is called to locate the client dif structure allocated in the TEGW.Login routine by tp_csi_alloc. After being located the dif structure is deleted with the DelDIF function.

If any errors are encountered in steps 2 or 3, the server raises alarms and prints error messages, but continues with the logout routine.

Call Center Application Development Environment

Figure 5:
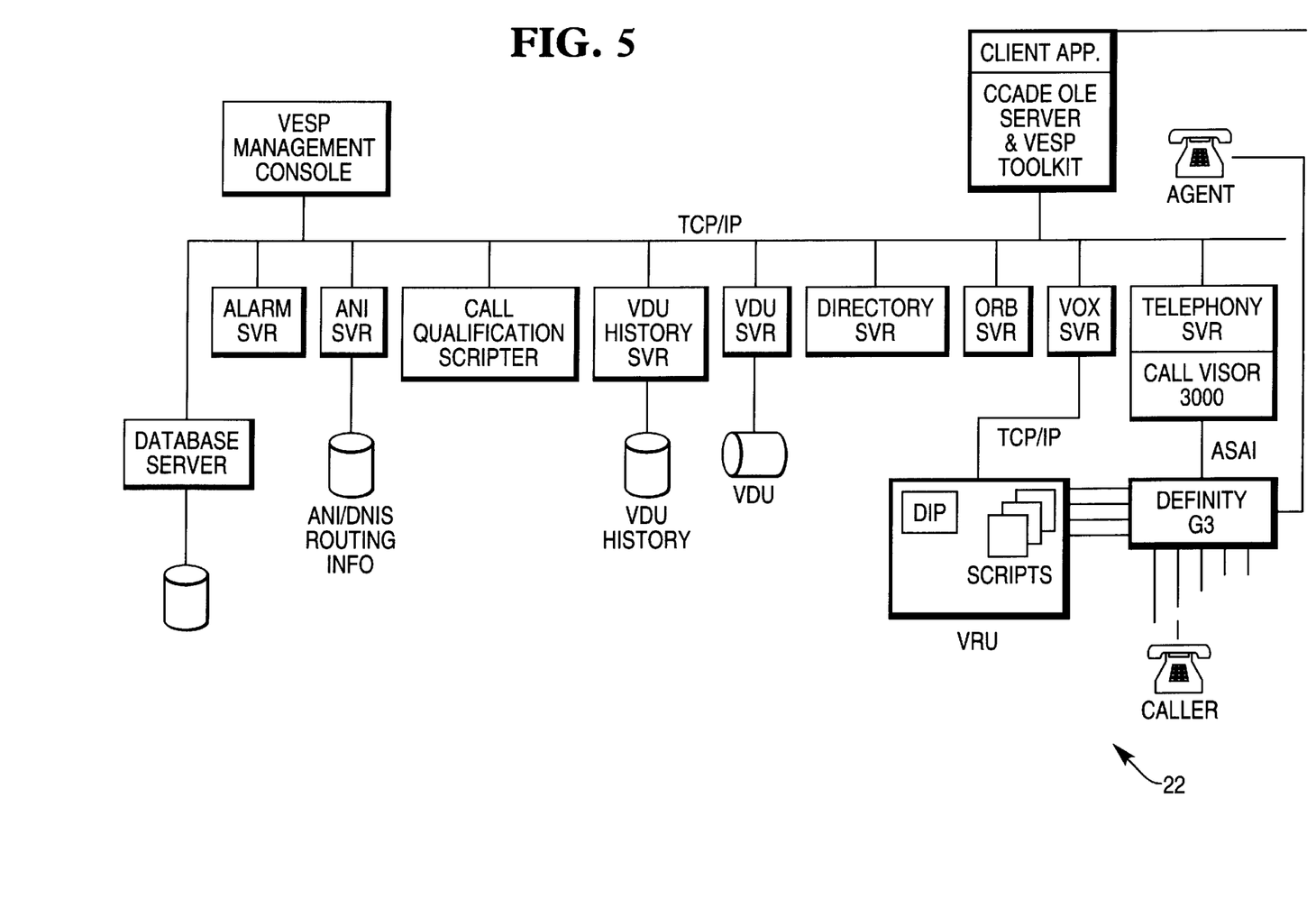
FIG. 5 represents the architectural model for the Call Center Application Development Environment (CCADE)

FIG. 5 represents the architectural model for CCADE 22. CCADE is customized extensions complementing CTI middleware provided by Nabnasset corporation. This application development environment provides for rapid development of computer telephony and call management systems for call center applications.

At the core of the architecture is an NCR CTI server. This server is the standard BCC 2 server platform running MP-RAS UNIX with the CV3000 product component added to it. The CV3000 product provides the ASAI ISDN BRI interface link to the Definity switch and Conversant IVRU components provided by GBCS. In addition to the CV3000, CCADE software components run on the CTI server and the agent workstations. Object oriented middleware from Nabnasset provides several key functions including the following:

Client/server object oriented programming environment,

Telephony and VOX server modules for switch and IVRU access,

Directory server module to map agent phone number and workstation addresses,

Event module and architecture for call center logging and event tracking,

Overall Call Qualification Software that is the "brain" of call center operations and workflow, and Workstation object oriented interfaces to request "services" and interact with any of the server modules wherever they are located in the call center system.

The Call Center Application Development Environment (CCADE) 22 provides a complete, end to end solution leveraging Computer and Telephony Integration (CTI) competencies. Leverage of automated systems is essential for optimization of productivity gains synonymous with CTI enabled systems. Automatic Number Identification (ANI) and Dialed Number Information Service (DNIS) technology recognizes point of origin and point of destination information associated with the particular customer calling or service they are calling. Interactive Voice Response Unit (IVRU) technology provides menu options to:

Verify the customer identity,

Facilitate direct customer access for resolution of issues (e.g. account balances, billing inquiries) and To direct customers to various customer service representatives (CSRs).

When the caller's identity has been established through ANI/DNIS matching or IVRU input, the CCADE system can be used to:

Pre-fetch customer information for the CSR prior to the audio connection being made, Ensure that the most appropriately skills CSR available for that customer receives the call, Cater to customer language preference e.g. Spanish speaking agent, and Provide agents with information about the customer, including previous call history, Voice Response activity on this call, etc.

If a second agent is required, the system ensures all information about the call is transferred automatically to eliminate the re-keying of any data.

Major TOP END Components

Figure 6:
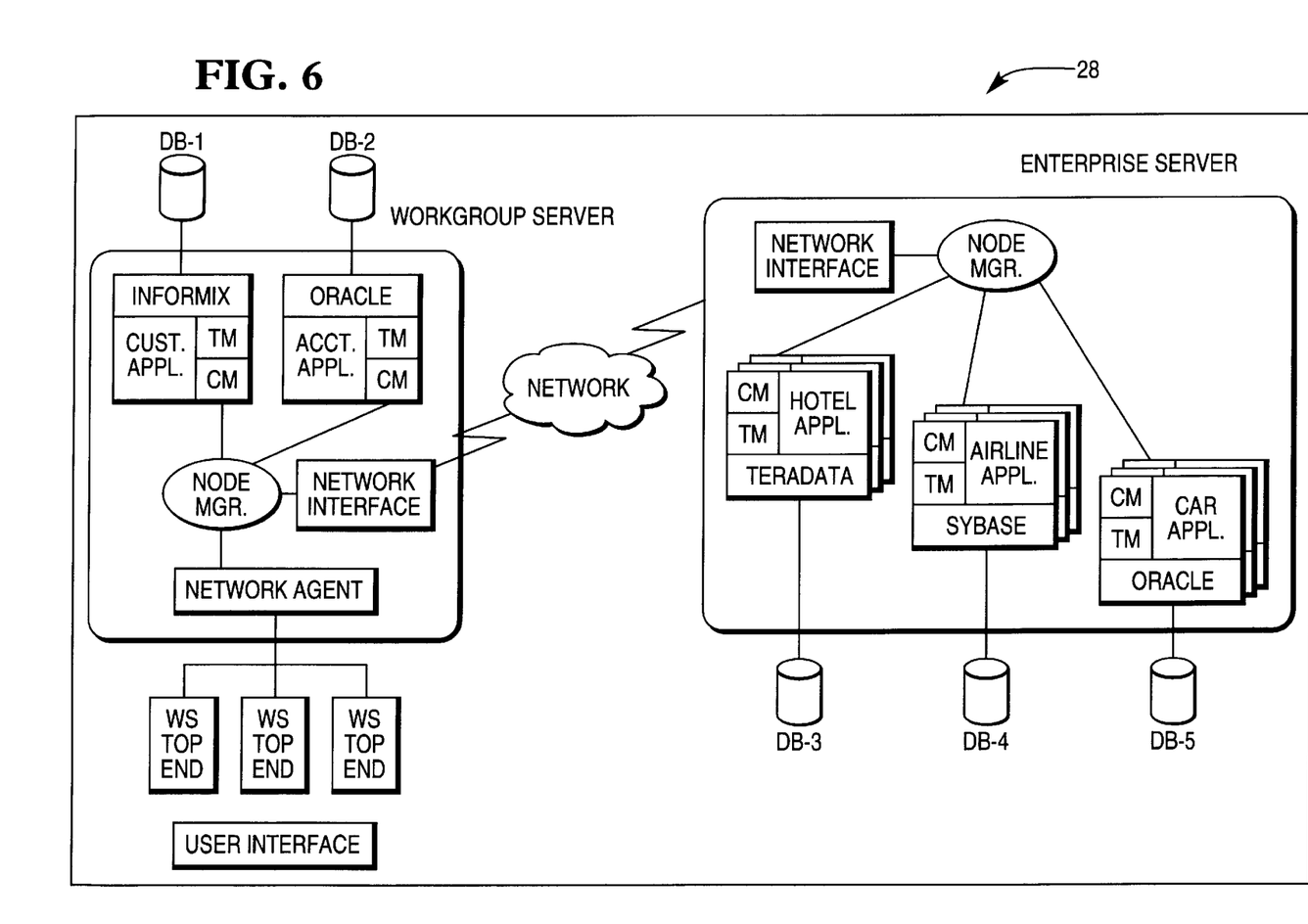
FIG. 6 illustrates the main components of the standard TOP END server.

FIG. 6 illustrates the main components of the standard TOP END 28 TOP END functions are divided into several modular components that are designed for a distributed, message-passing environment. In TOP END terminology, a "component" is a process or logical group of processes that performs a function. TOP END components are broken down into online components that work together to process distributed transactions during the online day, and tools that are essential to define and manage an open distributed environment.

The fundamental TOP END component is the application component. Application components are used to create and grow distributed TOP END systems. Applicants reside in the application components, and it is the application components that are distributed on the various nodes throughout the network. The applications could be user-written, provided as a solution by an independent vendor, or supplied by, for example, AT&T as part of the TOP END base product. A comprehensive set of services and libraries are available to an application component. An application component can begin and end distributed transactions, interface with resource managers, interface with communication managers, and more.

Another key online component is the node manager. The node manager is a collection of processes that offer core services to allow TOP END processing to take place on a given node. These processes, in general, work independently of each other. Processes on a TOP END node that share node manager services include application components, network interface processes, and logging and transaction services. Services provided by the node manager include transaction management (for example, commit coordination), logging, failure recovery, client/server request handling, security management, runtime administration, and application component control.

Network agents are used to allow transactions and service requests to enter a TOP END system from an application or networked workstation that does not have a node manager on it. TOP END's Remote Client support uses a network agent.

The login client is a special case of a TOP END application component. The login client uses a library of terminal support routines and TOP END screen formats to facilitate communications between a character-mode terminal (client) and a TOP END application program (service).

In addition to providing the components and services needed to execute, TOP END provides a myriad of tolls for managing the environment. These tools include:

Administration—including a full range of graphical, menu based administrative tools that make it easy to manage distributed runtime environments.

Interactive System Definition—providing a user-friendly, MS Windows interface for defining TOP END systems.

Format Management—allowing screen layouts to be easily created and customized for a wide variety of devices.

Application Development—permitting choices for application development from native C, C++ and COBOL to high level 4GL client/server development tools.

TOP END is considered "robust middleware" because it provides an environment rich in features like the following:

Distributed Transaction Management—supports transactions that perform work on multiple geographically distributed nodes accessing multiple heterogeneous resource managers.

Support for Client/Server Interaction—offer's services for cooperative processing that allows clients and servers to participate in a distributed transaction.

Dynamic Workload Balancing—automatically generates and manages parallel copies (replicas) of applications and performs all the needed workload balancing among the copies to ensure that they are all evenly utilized.

Choice of Execution Paths—allows clients, servers, and nodes to be configured differently depending on your performance and availability requirements.

Recovery Transaction Queuing—provides a modular store-and-forward capability that enables applications to submit requests to other applications via durable transaction queues.

Application Parallelization—dynamic replication of distributing applications throughout an enterprise.

Two-Phase Commit Processing—supporting transactions that have steps processed on different processing nodes in the network by using a two-phase commit process that is completely transparent to applications.

Message-Sensitive Routing—routing messages based on data in the message.

Automatic Software Distribution—automatically distributes software from the administrative node to other TOP END nodes.

Automatic Recovery—provides automatic recovery from application failures, transaction failures, network failures, and node failures.

Mainframe—Class Safety Nets—provides database consistency, transaction recovery, fault tolerance, application resilience, enhanced security and more.

Multiple Database Support—TOP END is XA-compliant, and directly supports leading DBMS systems including Oracle, Informix, Teradata, and Sybase.

Heterogeneous Platform Support—runs on UNIX platforms from Amdahl, AT&T, Digital, HP, Pyramid, IBM, Sun and Unisys as well as on NT. TOP END clients run on any of the server platforms as well as on DOS, OS/2, Windows 3.1, Windows95 and NT.

Scalability—TOP END's modular design, allows the addition of new applications, new users, and new processing nodes to your enterprise system.

The core of this gateway functionality is converting the sequence of couples from the VESP client 24, 26 to a C/C++ style structure expected by TOP END 28, 30, 32, 34. The TEGW 20 also converts the replies from TOP END 28, 30, 32, 34 (received as a C/C++ structure) and converting to a sequence of couples before sending the results back to the CORBA based client.

The TEGW 20 reads in an initialization file at start up which contains the CORBA to C/C++ style mappings used by the converter, which means the gateway code does not have to be changed if conversion mappings need to be added, changed, or removed. Conversions are done in a way to hide structure alignment issues from the client. In our approach, the data conversion algorithm is done on the computer system where the data is sent to the software server that uses the C/C++ style structures. This eliminates the need for client programs and programmers to know the hardware and software characteristics of the server.

Advantageously, the conversion formats from CORBA to C/C++ and/or C/C++ to CORBA are read from an initialization file using a parser. In this case, we use the UNIX system parser lex, however, other parsers may also be used. There are certain limitations on nesting C/C++ structures imposed by the current implementation, but conversion of the following data types are supported between the C/C++ and CORBA data structure environments.

| char | unsigned char | array of chars |
|---|---|---|
| short | unsigned short | array of shorts |
| float | unsigned float | array of floats |
| int | unsigned int | array of ints |
| long | unsigned long | array of longs |

During the reading process, a simple data dictionary is built. The dictionary has two parts. The first part is a format index table that holds a list of the names of all formats and the attributes in each format, and an attribute table that describes each attribute used in the formats. The attribute table also keeps the names and offsets (calculated and aligned) of the structure elements defined in the formats.

The programmer calls the decoder or encoder functions using three variables: the CORBA sequence of couples, a memory structure address for the C/C++ structure, and the conversion format from the format file to be used in the conversion.

Figure 7:
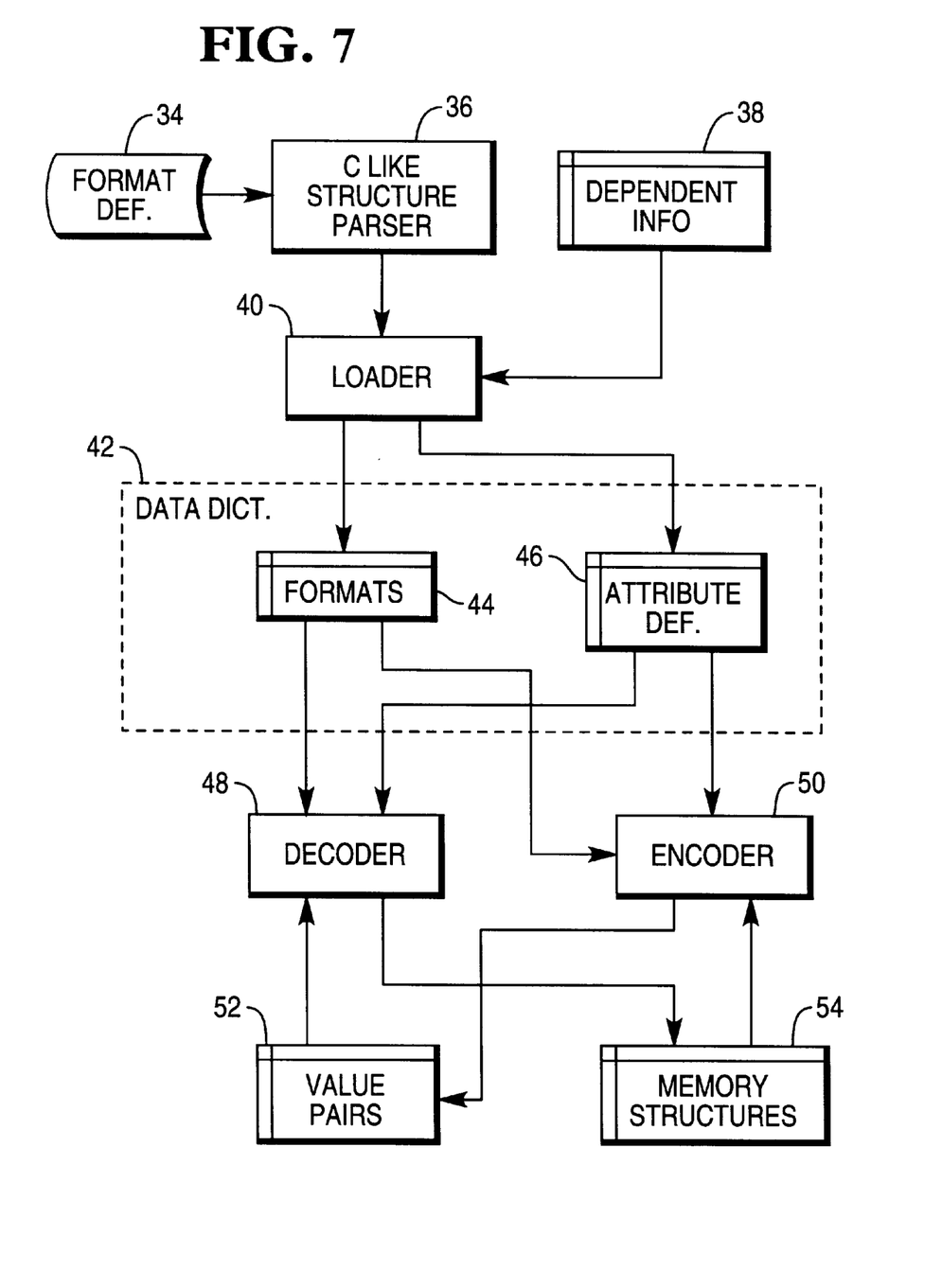
FIG. 7 illustrates the main functions of this conversion process and the relations of these functions with each other are defined.

FIG. 7 illustrates the main functions of this conversion process and the relations of these functions with each other are defined. Although the algorithm is used as a part of TOP END Gateway today, it can be used in any conversion from a value pair system to C/C++ structures. This algorithm is designed as hardware and operation system independent. Only a header file change and recompiling will be required in new environments.

In FIG. 7, format definition database or file 34 includes user defined definitions. The structure parser 36 parses the user defined information (e.g., C/C++ and/or CORBA specific information or other software language specific information having similar characteristics as the data couples). System dependent information file 38 includes system dependent information related to, or dependent on, the size of the data structures characteristic of different operating systems and/or processors.

System dependent information includes, for example, floating point numbers, integers, long integers, unsigned integers and similar information that depends on the operating system and the processor chip that is being used in the computer. For example, different processors and/or operating systems have different definitions and take up a different amount of space.

At initialization time for the TEGW server, the TEGW server looks at the format definitions 34. TEGW makes sure that format definitions 34 are valid types, and contain understandable information. TEGW also looks at or refers to the system dependent information 38. Loader 40 generates basically the data dictionary 42, including, for example, formats 44 and attribute definitions 46.

The formats 44 are like the formats of strings and structures that are used, and the attribute definitions 46 are the constructs or things that make up those formats. The value pairs 52 comprises, for example, the CORBA specific information relating to data couples. Memory structures 54 comprise the C/C++ type or specific information, described below. A format name is included as part of the format definition 34. Also part of the format definition 34 are integers or character strings. The format definition 34 is loaded into the formats 44 and attribute definition 46 of the data dictionary 42, and then that data dictionary 42 is used by both the decoder 48 and encoder 50 as part of the conversion process, described in detail below.

Data output from the encoder 50 is encoded, for example, into the CORBA data couples in value pairs 52. Data output from decoder 48 is decoded from, for example, CORBA to C/C++ in memory structures 54.

Figure 8:
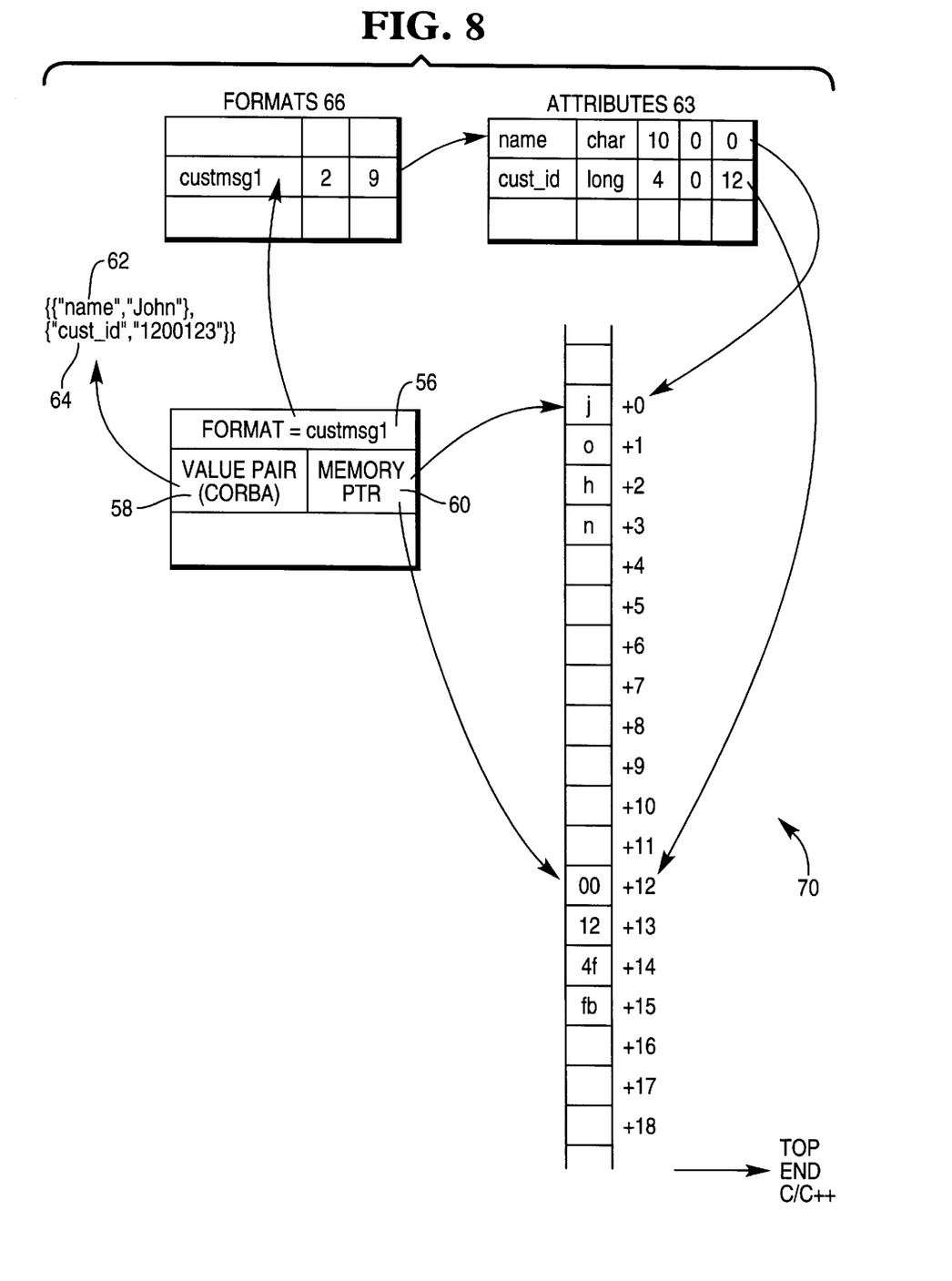
FIG. 8 gives an example of how the conversion algorithm works.

FIG. 8 is an illustration of an example of how the conversion process is implemented from a CORBA data couple to C/C++ memory structures. In FIG. 8, the format= custmsg1 information 56 represents the format definitions supplied by the user. Format 56 indicates or includes value pair 58 and memory pointer 60. Value pair 58 includes, for example, a name 62 and a cust_id 64. Value pair 58 represents the CORBA version.

Format 66 includes, for example, indexes (e.g., 2, 9 and/or 29) into the attribute table 68. For example, one index may relate to the number of attributes (e.g., 2), and another index may represent an index into the attribute table (e.g., 9). Attribute table 68 includes, for example, the name and customer-id which relate to the name of the name value pair in CORBA. The C/C++ structure data type, (e.g., character or a long), and the size and bytes of the data type (e.g., 10, 4) are also included.

The character is 10 bytes, and the long is 4 bytes in FIG. 8. The character is defined, for example, as part of the format definitions, and the long (and other numerical entities) is defined as part of the system dependent information. In C/C++, a character's size is generally user definable, whereas integers and other numerical quantities tend to be operating system dependent. The characters are normally defined inside of the program. Thus, the size of the character is in the format definition file. The remaining information will tend to be in the system dependent information.

In the next column, the 0 0 column shows that there other information about the attributes can be stored. The final 0 12 column is an offset. The offset of 0 for "name" points to the +0 memory position in memory structure 70. The offset 12 for "cust_id" points to the memory position +12 in memory structure 70. Thus, the C/C++ component is built.

Note that C/C++ style data structures are simply a contiguous chunk of memory which are broken into sections that programmers can easily access. For example, in memory position +12, the cust_id "1200123" is represented in hexadecimal format at the string of numbers "00124ffb" in memory positions +12, +13, +14, +15. The memory structure 70 is then transmitted to the TEGW in the C/C++ form.

Thus, the conversion process in TEGW converts a chunk of memory which is pointed to by that memory pointer. The Memory pointer knows or identifies a start in location of an adequately sized chunk of memory which has been allocated for this conversion process. The conversion routine loads the memory structure in the required manner using the COBRA data couple.

The many features and advantages of the invention are apparent from the detailed specification, and thus, it is intended by the appended claims to cover all such features and advantages of the invention which fall within the true spirit and scope of the invention Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

GLOSSARY activation—Preparing an object to execute an operation. For example, copying the persistent form of methods and stored data into an executable address space to allow execution of the methods on the stored data.

adapter—Same as object adapter.

attribute—An identifiable association between an object and a value. An attribute A is made visible to clients as a pair of operations: get_A and set_A. Readonly attributes only generate a get operation.

behavior—The observable effects of an object performing the requested operation including its results binding.

CCADE—refers to the standard Call Center Application Development Environment available through NCR Corporation.

class—See interface and implementation for alternatives.

client—The code or process that invokes an operation on an object.

context object—A collection of name-value pairs that provides environmental or user-preference information.

CORBA—Common Object Request Broker Architecture, upon which VESP is based.

data type—A categorization of values operation arguments, typically covering both behavior and representation (i.e., the traditional non-OO programming language notion of type).

deactivation—The opposite of activation.

deferred synchronous request—A request where the client does not wait for completion of the request, but does intend to accept results later.

domain—A concept important to interoperability, it is a distinct scope within which common characteristics are exhibited, common rules observed, and over which a distribution transparency is preserved.

dynamic invocation—Constructing and issuing a request whose signature is possibly not known until runtime.

dynamic skeleton—An interface-independent kind of skeleton, used by servers to handle requests whose signatures are possibly not known until runtime.

externalized object reference—An object reference expressed as an ORB-specific string. Suitable for storage in files or other external media.

Gateway—refers to a means of access or bridge between two software products.

implementation—A definition that provides the information needed to create an object and allow the object to participate in providing an appropriate set of services. An implementation typically includes a description of the data structure used to represent the core state associated with an object, as well as definitions of the methods that access that data structure. It will also typically include information about the intended interface of the object.

implementation inheritance—The construction of an implementation by incremental modification of other implementations. The ORB does not provide implementation inheritance.

implementation object—An object that serves as an implementation definition. Implementation objects reside in an implementation repository.

implementation repository—A storage place for object implementation information.

inheritance—The construction of a definition by incremental modification of other definitions. See interface and implementation inheritance.

instance—An object is an instance of an interface if it provides the operations, signatures and semantics specified by that interface. An object is an instance of an implementation of its behavior is provided by that implementation.

interface—A listing of the operations and attributes that an object provides. This includes the signatures of the operations, and the types of the attributes. An interface definition ideally includes the semantics as well. An object satisfies an interface if it can be specified as the target object in each potential request described by the interface.

interface inheritance—The construction of an interface by incremental modification of other interfaces. The IDL language provides interface inheritance.

interface object—An object that serves to describe an interface. Interface objects reside in an interface repository.

interface repository—A storage place for interface information.

interface type—A type satisfied by any object that satisfies a particular interface.

interoperability—The ability for two or more ORBs to cooperate to deliver requests to the proper object. Interoperating ORBs appear to a client to be a single ORB.

language binding or mapping—The means and conventions by which a programmer writing in a specific programming language accesses ORB capabilities.

method—An implementation of an operation. Code that may be executed to perform a requested service. Methods associated with an object may be structured into one or more programs.

method resolution—The selection of the method to perform a requested operation.

MSR—refers to TOP END's standard Message Sensitive Routing feature.

multiple inheritance—The construction of a definition by incremental modification of more than one other definition.

object—A combination of state and a set of methods that explicitly embodies an abstraction characterized by the behavior of relevant requests. An object is an instance of an implementation and an interface. An object models a real-world entity, and it is implemented as a computational entity that encapsulates state and operations (internally implemented as data and methods) and responds to requester services.

object adapter—The ORB component which provides object reference, activation, and state related services to an object implementation. There may be different adapters provided for different kinds of implementations.

object creation—An event that causes the existence of an object that is distinct from any other object.

object destruction—An event that causes an object to cease to exist.

object implementation—Same as implementation.

object reference—A value that unambiguously identifies an object. Object references are never reused to identify another object.

objref—An abbreviation for object reference.

one-way request—A request where the client does not wait for completion of the request, nor does it intend to accept results.

operation—A service that can be requested. An operation has an associated signature, that may restrict which actual parameters are valid.

operation name—A name used in a request to identify an operation.

ORB—Object Request Broker. Provides the means by which clients make and receive requests and responses.

ORB core—The ORB component which moves a request from a client to the appropriate adapter for the target object.

parameter passing mode—Describes the direction of information flow for an operation parameter. The parameter passing modes are IN, OUT, and INOUT.

persistent object—An object that can survive the process or thread that created it. A persistent object exists until it is explicitly deleted.

referential integrity The property ensuring that an object reference that exists in the state associated with an object reliably identifies a single object.

repository—See interface repository and implementation repository.

request—A client issues a request to cause a service to be performed. A request consists of an operation and zero or more actual parameters.

results—The information returned to the client, which may include values as well as status information indicating that exceptional conditions were raised in attempting to perform the requested service.

RTQ—refers to TOP END's standard Recoverable Transaction Queuing feature.

server—A process implementing one or more operations on one or more objects.

server object—An object providing response to a request for a service. A given object may be a client for some requests and a server for other requests.

signature—Defines the parameters of a given operation including their number order, data types, passing mode, the results if any, and the possible outcomes (normal vs. exceptional) that might occur.

single inheritance—The construction of a definition by incremental modification of one definition. Contrast with multiple inheritance.

skeleton—The object-interface-specific ORB component which assists an object adapter in passing requests to particular methods.

state—The time-varying properties of an object that affect that object's behavior.

static invocation—Constructing a request at compile time. Calling an operation via a stub procedure.

stub—A local procedure corresponding to a single operation that invokes that operation when called.

synchronous request—A request where the client pauses to wait for completion of the request.

TEGW—refers to the CCADE TOP END Gateway server.

TEGW.Login—Establishes a TOP END dialogue for the client.

TEGW.Send—This method is used to send a request to a TOP END service.

TEGW.Receive—This method is used to receive a request from a previously invoked TEGW.Send.

TEGW.Logout—Tears down the dialogue created with TEGW.Login.

TOP END—refers to the TOP END transaction monitor.

TOP END Product—refers to a collection of TOP END functions grouped into a functional set.

TOP END Function—refers to the smallest unit of TOP END that can be accessed from other TOP END servers or clients. This is similar to CORBA methods (like standard TS.makecall or VDU.getvalues).

transient object—An object whose existence is limited by the lifetime of the process or thread that created it.

type—See data type and interface.

value—Any entity that may be a possible actual parameter in a request. Values that serve to identify objects are called object references.

VESP—refers to the Voice Enhanced Services Platform developed by Nabnasset Corp. VESP is the core middleware used by CCADE.

VESP Method—refers to the smallest unit of a VESP server that can be called from another VESP or CCADE server or client.

What is claimed is:

1. A conversion system for converting data between CORBA and C/C++ environments, comprising:
   a format definition database storing first information including at least one of user definitions and at least one of C/C++ and CORBA specific information;
   a system dependent database storing second information including at least one of operating system and processor specific information;
   a parser, responsively connected to said format definition database and said system dependent database, parsing the first and second information into a data dictionary; and
   at least one of a decoder generating first C/C++ memory structures using the data dictionary and first CORBA data couples, and an encoder generating second CORBA data couples using the data dictionary and second C/C++ memory structures.

2. A conversion system for converting data between CORBA and C/C++ environments according to claim 1, wherein the data dictionary comprises a format index table including a list of the names of all formats and attributes in each format, and an attribute table describing each of the attributes.

3. A conversion system for converting data between CORBA and C/C++ environments according to claim 2, wherein the attribute table further stores names and offsets of the C/C++ memory structures defined in the formats.

4. A conversion system for converting data between CORBA and C/C++ environments according to claim 1, wherein the at least one of the decoder and encoder utilizes the CORBA data couples, the C/C++ memory structures, and the first information to be used in the converting of the data.

5. A conversion system for converting data between CORBA and C/C++ environments according to claim 1, wherein the conversion system implements the converting that is independent of hardware and operation system.

6. A conversion system for converting data between CORBA and C/C++ environments according to claim 1, wherein the conversion system implements the converting for different environments without recompilation.

7. A conversion system for converting data between CORBA and C/C++ environments according to claim 1, wherein the second information is dependent on at least one of an operating system and a processor.

8. A conversion system for converting data between CORBA and C/C++ environments, comprising:
   a data file storing first information including at least one of user definitions and at least one of C/C++ and CORBA specific information, and second information including at least one of operating system and processor specific information;
   a parser, responsively connected to said data file, parsing the first and second information into a data dictionary; and
   at least one of a decoder generating first C/C++ memory structures using the data dictionary and first CORBA data couples, and an encoder generating second CORBA data couples using the data dictionary and second C/C++ memory structures.

9. A conversion system for converting data between CORBA and C/C++ environments, comprising:
   format definition means for storing first information including at least one of user definitions and at least one of C/C++ and CORBA specific information;
   system dependent means for storing second information including at least one of operating system and processor specific information;
   parser means for parsing the first and second information into a data dictionary; and
   at least one of decoder means for generating first C/C++ memory structures using the data dictionary and first CORBA data couples, and encoder means for generating second CORBA data couples using the data dictionary and second C/C++ memory structures.

10. A computer program product, storing computer instructions to convert data between CORBA and C/C++ environments using a computer, the computer instructions including:
    (a) storing first information including at least one of user definitions and at least one of C/C++ and CORBA specific information;
    (b) storing second information including at least one of operating system and processor specific information;
    (c) parsing the first and second information into a data dictionary; and
    (d) at least one of generating first C/C++ memory structures using the data dictionary and first CORBA data couples, and generating second CORBA data couples using the data dictionary and second C/C++ memory structures.

11. A conversion method of converting data between CORBA and C/C++ environments, comprising the steps of:
    (a) storing first information including at least one of user definitions and at least one of C/C++ and CORBA specific information;
    (b) storing second information including at least one of operating system and processor specific information;
    (c) parsing the first and second information into a data dictionary; and
    (d) at least one of generating first C/C++ memory structures using the data dictionary and first CORBA data couples, and generating second CORBA data couples using the data dictionary and second C/C++ memory structures.

12. A conversion method for converting data between CORBA and C/C++ environments according to claim 1, wherein said parsing step (c) further comprises the step of parsing the first and second information into the data dictionary including a format index table having a list of the names of all formats and attributes in each format, and an attribute table describing each of the attributes.

13. A conversion method converting data between CORBA and C/C++ environments according to claim 12, further comprising the step of storing names and offsets of the C/C++ memory structures defined in the formats in the attribute table.

14. A conversion method for converting data between CORBA and C/C++ environments according to claim 11, wherein said generating step (d) further comprises the step of the at least one of the decoder and encoder utilizes the CORBA data couples, the C/C++ memory structures, and the first information for the converting.

15. A conversion method for converting data between CORBA and C/C++ environments according to claim 11, wherein the conversion method implements the converting independent of hardware and operation system.

16. A conversion method for converting data between CORBA and C/C++ environments according to claim 11, wherein the conversion method implements the converting for different environments without recompilation.

17. A conversion method for converting data between CORBA and C/C++ environments according to claim 11, wherein the second information is dependent on at least one of an operating system and a processor.

* * * * *